(12) United States Patent
Weckerle et al.

(10) Patent No.: US 8,735,764 B2
(45) Date of Patent: May 27, 2014

(54) THERMODE DEVICE FOR A MULTITUDE OF SEMICONDUCTOR COMPONENTS

(75) Inventors: Ewald Weckerle, Wenzenbach (DE);
Alexander Wodarz, Munich (DE);
Stefan Bierl, Waldmunchen (DE);
Niklas Sigmund, Zell (DE)

(73) Assignee: Muehlbauer AG, Roding (DE)

( * ) Notice: Subject to any disclaimer, the term of this patent is extended or adjusted under 35 U.S.C. 154(b) by 1664 days.

(21) Appl. No.: 12/063,632

(22) PCT Filed: Jul. 28, 2006

(86) PCT No.: PCT/EP2006/064805
§ 371 (c)(1),
(2), (4) Date: Feb. 12, 2008

(87) PCT Pub. No.: WO2007/020174
PCT Pub. Date: Feb. 22, 2007

(65) Prior Publication Data
US 2009/0261074 A1 Oct. 22, 2009

(30) Foreign Application Priority Data
Aug. 12, 2005 (DE) .......................... 10 2005 038 416

(51) Int. Cl.
*B23K 37/00* (2006.01)
(52) U.S. Cl.
USPC ...................... 219/85.1; 219/233; 228/180.22
(58) Field of Classification Search
USPC .......... 219/85.16, 85.18, 221, 243, 227–239; 228/51–55, 180.2, 180.22
See application file for complete search history.

(56) References Cited

U.S. PATENT DOCUMENTS

| 3,941,297 | A | 3/1976 | Burns et al. |
| 4,871,899 | A | 10/1989 | DuFrenne |
| 5,717,190 | A * | 2/1998 | Inoue ............................. 219/522 |
| 6,278,089 | B1 * | 8/2001 | Young et al. ............... 219/443.1 |
| 2001/0014490 | A1 | 8/2001 | Ida et al. |
| 2007/0023478 | A1 * | 2/2007 | Levannier et al. ............ 228/1.1 |

FOREIGN PATENT DOCUMENTS

| DE | 10105164 | 5/2002 |
| DE | 10251896 | 6/2004 |
| EP | 0539851 | 5/1993 |
| WO | WO0041219 | 7/2000 |
| WO | WO2007020174 A1 | 2/2007 |

* cited by examiner

*Primary Examiner* — Brian Jennison
(74) *Attorney, Agent, or Firm* — John A. Miller; Miller IP Group, PLC

(57) ABSTRACT

A thermode device for connecting and/or electrically contacting a plurality of first semiconductor components to at least one support element and/or to a plurality of second semiconductor components by heating an adhesive under the application of pressure. An example thermode device includes a basic body and a heating element which can be extended out of the basic body and which, under the application of pressure, acts on at least one of the first semiconductor components, wherein the basic body has on its underside a plurality of heating plates which are oriented vertically and are arranged next to one another. Each heating plate has on its end and underside a plurality of the extendable heating elements, to the underside of each of which there is assigned a first semiconductor component.

12 Claims, 5 Drawing Sheets

THERMODE DEVICE FOR A MULTITUDE OF SEMICONDUCTOR COMPONENTS

PRIORITY CLAIM

This application claims priority from International Application No. PCT/EP2006/064805, the contents of which are herein incorporated by reference. That PCT application claims priority from German Application No. 10 2005 038 416.1 filed Aug. 12, 2005.

FIELD OF THE INVENTION

The invention relates to a thermode device for connecting and/or electrically contacting a plurality of first semiconductor components to at least one support element and/or to a plurality of second semiconductor components by heating an adhesive under the application of pressure, according to the preamble of claim 1.

BACKGROUND OF THE INVENTION

In order to produce microelectronic assemblies, semiconductor components such as silicon chips for example, which can also be applied as flip-chips, are mounted on support substrates which may comprise an antenna, or on other semiconductor components which may again be silicon chips. For such mounting of the semiconductor components, use is often made of contact adhesives in order both to fix the semiconductor component and at the same time provide an electrical contact between connection points of the chip and of the support substrate or of a further chip. The contact adhesives or solders used for this are usually cured by means of thermode units at an increased temperature and under the application of pressure.

Conventionally, thermode devices which are used for this, as known for example from U.S. Pat. No. 4,736,882, have a heating body on their underside, which heating body can be displaced upwards and downwards along the vertical in order to apply pressure to or release the components to be connected and the adhesives arranged there between during a heat transfer process. Such thermode devices which have a single thermode are often arranged on a ram. The thermodes then have to be acted upon individually by individual pressure and temperature parameters. Such an actuation process which is directed at an individual thermode requires a complex design which is expensive to produce since a plurality of such thermodes are arranged in a common connecting device.

Such individual thermode devices which are combined to form a connecting device may be arranged next to one another with a minimum distance between them which is defined by the dimensions of the guide elements that hold the individual thermodes or the heating elements which are arranged displaceably therein. Since such individual thermode devices each have their own heating device, the external dimensions of such an individual thermode device are so large that it is not possible to arrange these individual thermode devices next to one another in parallel alignment with a distance of for example less than 10 mm.

As an alternative, thermode devices are known which are characterized in that a plurality of thermodes are arranged on the underside of a common plate, wherein such thermodes cannot be adjusted individually in terms of their pressure. As a result, there is necessarily a need for the plate to be placed for example on a support substrate containing a plurality of semiconductor components which are to be connected to the support substrate, without said plate being tilted or inclined, in order to prevent any damage being caused to those semiconductor components which are contacted first by a thermode in the case of an inclined plate.

In principle, due to the increasing miniaturization of the semiconductor components that have to be mounted during the application of pressure by a basic body, there is an increasing risk of damage to such small semiconductor components. This leads to malfunctions of the mounted semiconductor components.

SUMMARY OF THE INVENTION

Accordingly, the object of the present invention is to provide a thermode device for connecting and/or electrically contacting a plurality of semiconductor components to at least one support element and/or to a plurality of further semiconductor components, which allows the simultaneous curing of portions of adhesive that are used for a plurality of semiconductor components even when there is a small distance between the latter.

This object is achieved according to the features of claim 1.

The core concept of the invention is to provide a thermode device for connecting and/or electrically contacting a plurality of first semiconductor components to at least one support element and/or to a plurality of second semiconductor components by heating an adhesive under the application of pressure, in such a way that a basic body has on its underside a plurality of heating plates which are oriented vertically and are arranged next to one another, wherein each heating plate has on its end and underside a plurality of extendable heating elements, to the underside of each of which there is assigned a first semiconductor component. In this way, it is possible to apply pressure simultaneously to a plurality of first semiconductor components arranged closely next to one another, without this being associated with the uneven heating of individual adhesives and the uneven application of pressure to individual first semiconductor components. Rather, due to the arrangement of a plurality of heating plates, it is possible to ensure uniform heating of individual heating elements which in each case protrude from these heating plates and may be designed as cylindrical pins.

If these cylindrical pins are arranged within cylindrical channels of complementary shape inside the basic body such that they can be moved up and down in such a way that they can be acted upon on their rear, that is to say on their upper side, by a spring force by means of a spring element and this spring force can be adjusted by means of an adjusting element such as an adjusting screw, individual spring forces can be set for different first semiconductor components. In this way, the spring force can be set individually in a simple manner depending on the use of different adhesives or of semiconductor components of different height, even when the first semiconductor components are arranged at a distance of less than 10 mm, or even less than 4 mm.

As an alternative to using a spring element, an air cushion may also be provided in order to act in a damping manner on the displacement movements of the cylindrical pins.

By virtue of such an arrangement of the cylindrical pins, height differences between the support substrate and the first semiconductor components can be compensated.

This is particularly relevant when a plurality of first semiconductor components are arranged next to one another on a common support substrate.

At least one heating wire is arranged inside each heating plate, preferably in a snake-like shape, in order to heat the heating plate by means of electrical energy. This leads to uniform heating of each heating plate and thus to uniform heating of all the cylindrical pins arranged in this heating plate, which transmit the heat to the first semiconductor components arranged there below and to the portions of adhesive arranged below the first semiconductor components.

The uniform heating of each heating plate is preferably monitored by a wire-type temperature sensor, also arranged inside these heating plates, and is controlled by means of a control unit and regulated by means of a regulating unit.

Further advantageous embodiments emerge from the dependent claims.

BRIEF DESCRIPTION OF THE DRAWINGS

Advantages and expedient features can be found in the following description in conjunction with the drawing, in which.

DETAILED DESCRIPTION OF THE PREFERRED EMBODIMENT

Figure 1:
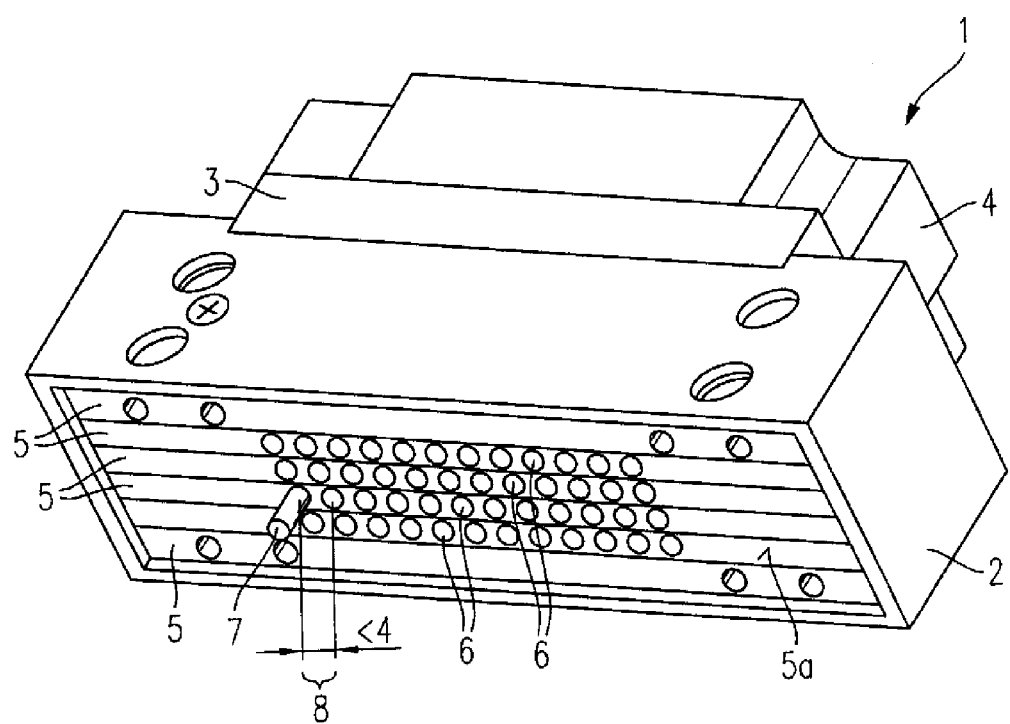
FIG. 1 shows, in a perspective view obliquely from below, a thermode device according to one embodiment of the invention.

FIG. 1 shows, in a perspective view obliquely from below, a thermode device according to one embodiment of the invention. The thermode device 1 comprises a basic body which is composed of the three basic body parts 2, 3 and 4.

A number of heating plates 5 of vertical orientation are arranged next to one another in the basic body part 2 in such a way that their largest surfaces or main faces bear against one another.

The heating plates 5 have an end and underside 5a, on which a plurality of openings 6 are arranged, which openings represent the openings of cylindrical channels that are arranged parallel to one another.

In each case, a cylindrical pin 7 is arranged displaceably in each cylindrical channel 9 or else only in selected cylindrical channels. The underside of the cylindrical pin 7 can be extended out of the end and underside 5a of the heating plates 5.

A distance 8 between the cylindrical pins 7 and thus the cylindrical channels is preferably in the order of magnitude of less than 4 mm, which corresponds to the distance between first semiconductor components (not shown here) which are to be connected to a support element or to second semiconductor components.

Figure 2:
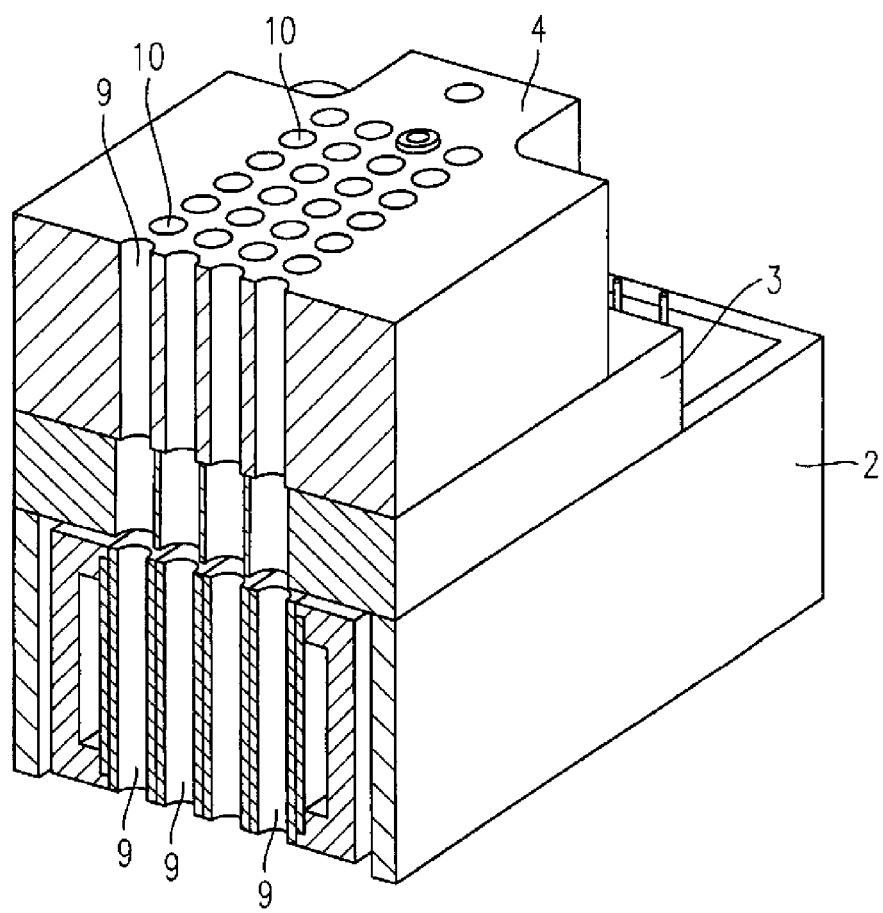
FIG. 2 shows, in a perspective cross-sectional view along the width side, the thermode device shown in FIG. 1.

FIG. 2 shows, in a perspective sectional view along the width direction, the thermode device shown in FIG. 1. Components which are identical or which perform the same function are provided with the same references.

It can clearly be seen from the sectional view shown in FIG. 2 that the basic body with its basic body parts 2, 3 and 4 has cylindrical channels 9 passing all the way through from bottom to top, said channels ending in openings 10 at the top.

Figure 3:
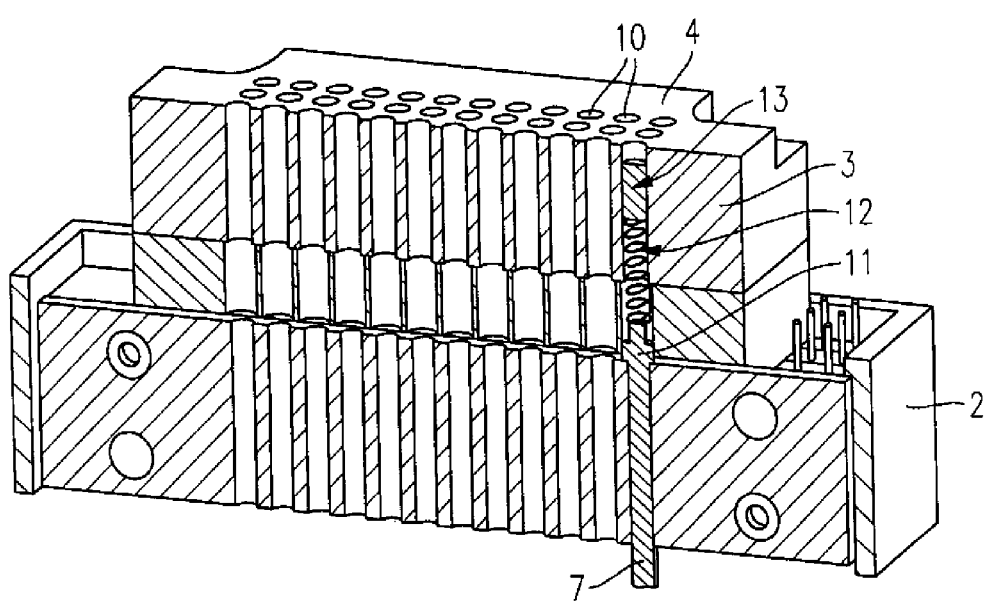
FIG. 3 shows, in a perspective cross-sectional view along the longitudinal side of the thermode device shown in FIG. 1, the thermode device according to the embodiment of the invention.

FIG. 3 shows, in a perspective sectional view along the longitudinal side of the thermode device 1, the arrangement of the cylindrical pin 7 inside the cylindrical channel 9. Arranged above the cylindrical pin 7 is a spring 12 which is acted upon by a prestressing force by means of an adjusting screw 13. The spring serves for force compensation as the basic body 2, 3, 4 moves downwards in order to apply pressure to individual first semiconductor components during the process of heating the adhesive. Such force compensation serves to prevent damage to individual chips or flip-chips that may be caused by being subjected to too high a force.

Due to a thermode array designed in this way with a plurality of cylindrical pins which represent the individual thermodes, it is possible for a plurality of flip-chips or chips to be heated at the same time under the application of pressure, wherein each individual thermode or thermode needle 7 can be adjusted by the spring 12 located in the basic body 2, 3, 4 which forms a block. This makes it possible to reliably fix the individual semiconductor chips to a support substrate by heating the thermode needles, even in the case of small distances between the individual semiconductor chips. Consequently, using a final bonder designed in this way, a higher throughput is possible within a device which manufactures smart labels for example, in which the chips are connected to antennas.

The thermode needle or cylindrical pin 7 has a wider head end 11 at the top, which ensures that the pin 7 does not fall downwards through the channel 9.

Figure 4:
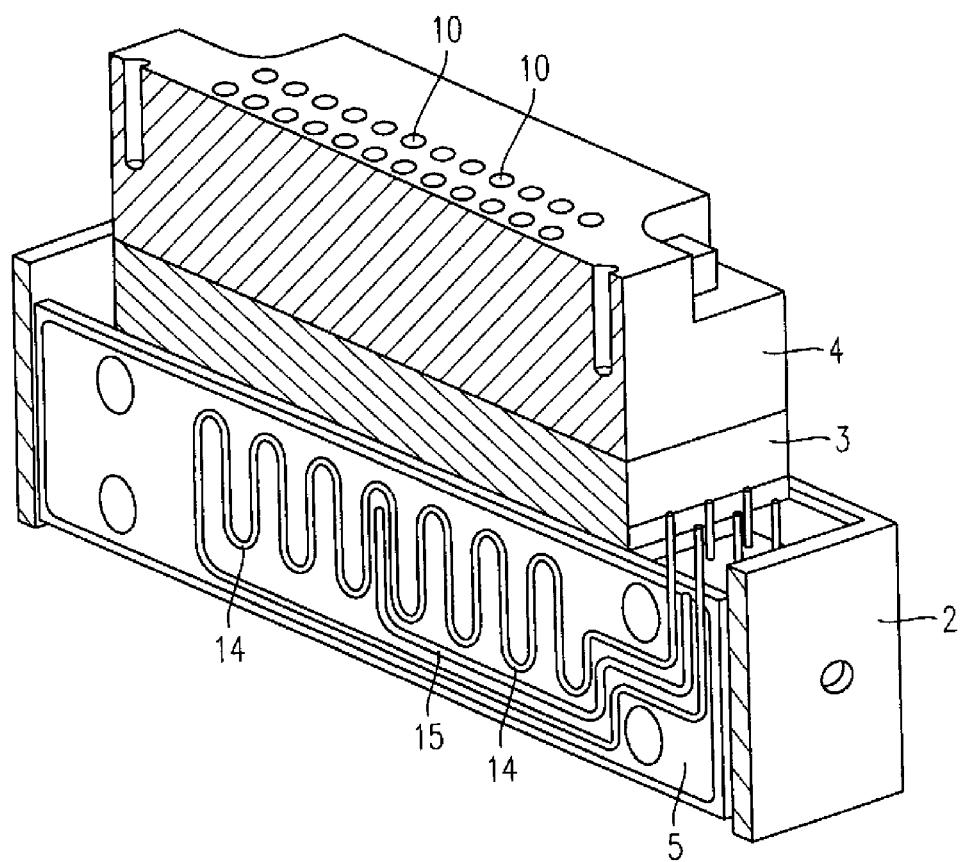
FIG. 4 shows, in a perspective cross-sectional view along the longitudinal side of the thermode device shown in FIG. 1, the thermode device with integrated heating wires.

FIG. 4 shows, in a perspective sectional view along the longitudinal side of the thermode device 1, a further cross section of the heating plate 5 in a region in which heating wires 14 with wire-type temperature sensors 15 are arranged. The heating wires 14 are preferably arranged in a snake-like manner, in order to ensure uniform heating of the heating plate 5 and thus uniform heating of all the pins 7. This is monitored by means of the temperature sensor 15 and if necessary is transmitted, via an output signal to a control unit (not shown here), by means of a feedback process to the heating wires 14 as a new temperature process to be regulated.

Figure 5:
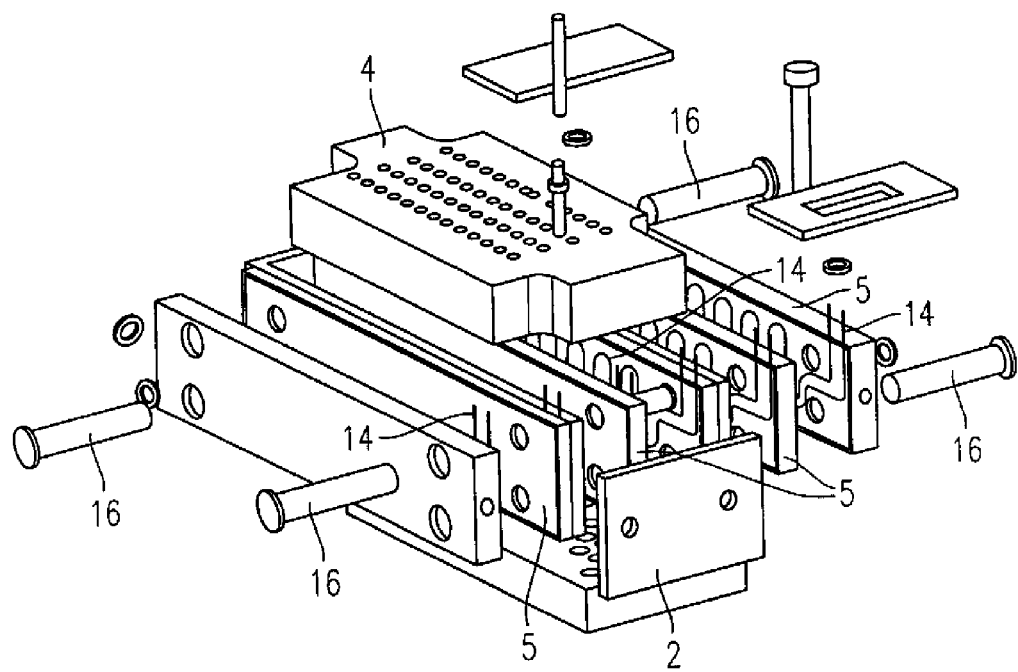
FIG. 5 shows, in a perspective exploded view, the thermode device according to the embodiment of the invention.

FIG. 5 shows, in a perspective exploded view, the individual parts of the thermode device according to the invention. It can clearly be seen from this diagram that the parts are held together by means of pins 16 or screws which are inserted through openings in the parts.

A device (not shown) provides a pneumatic compressed air cushion arranged individually at a first side of each of the cylindrical pins 7. The adjusting screw 13 includes a pressure control system (not shown) for individually adjusting a spring effect brought about by the provided compressed air cushion.

All of the features disclosed in the application documents are claimed as essential to the invention in so far as they are novel individually or in combination with one another with respect to the prior art.

While the preferred embodiment of the invention has been illustrated and described, as noted above, many changes can be made without departing from the spirit and scope of the invention. For example, the adjusting screw 13 may be any other know adjusting device. Accordingly, the scope of the invention is not limited by the disclosure of the preferred embodiment. Instead, the invention should be determined entirely by reference to the claims that follow.

LIST OF REFERENCES 1 thermode device
2, 3, 4 basic body parts
5 heating plates
5a ends and undersides of the heating plates
6 bottom openings
7 cylindrical pin 8 distance
9 cylindrical channels
10 top openings
11 wide head end
12 spring element
13 adjusting screw
14 heating wires
15 temperature sensor
16 pins, screws The embodiments of the invention in which an exclusive property or privilege is claimed are defined as follows:

1. A thermode device for connecting or electrically connecting a plurality of first semiconductor components to at least one support element or to a plurality of second semiconductor components by heating an adhesive under the application of pressure, the thermode device comprising:
   a basic body which comprises on its underside a plurality of heating plates which are oriented vertically and are arranged next to one another, each heating plate including at least one heater for generating heat and heating the heating plate; and
   a heating element which is extendable out of the basic body and which, under the application of pressure, acts on at least one of the first semiconductor components, wherein each heating plate has on its end and underside a plurality of the extendable heating elements, to the underside of each of which there is assigned a first semiconductor component, wherein each heating element is a separate element from the at least one heater, and wherein the plurality of heating elements extending from each heating plate are heated by the heating plate that has been heated by the heater.

2. The thermode device of claim 1, wherein each heating element is a cylindrical pin which can be displaced up and down inside the heating plate.

3. The thermode device of claim 1, wherein distance between the heating elements, which are arranged parallel to one another, is less than 10 mm.

4. The thermode device of claim 3, wherein each cylindrical pin is displaceable inside a cylindrical channel of complementary shape.

5. The thermode device of claim 4, further comprising:
   a spring element in contact with one end of the cylindrical pin; and
   an adjusting element in contact with the spring element for individually adjusting a spring force of the spring element.

6. The thermode device of claim 5, wherein the adjusting element comprises an adjusting screw.

7. The thermode device of claim 4, further comprising a pneumatic compressed air cushion arranged at a first side of the cylindrical pin.

8. The thermode device of claim 7, wherein the adjusting element comprises a pressure control system for individually adjusting a spring effect brought about by the compressed air cushion.

9. The thermode device of claim 1, wherein the at least one heater is at least one heating wire for heating the heating plate.

10. The thermode device of claim 9, wherein each heating plate includes a wire-type temperature sensor.

11. The thermode device of claim 1, wherein distance between the heating elements, which are arranged parallel to one another, is less than 4 mm.

12. The thermode device of claim 2, wherein each heating plate has a length, a width and thickness configured so that the length and width are substantially greater than the thickness and wherein the displacement direction of each cylindrical pin is parallel to the length or width direction of the heating plates.

* * * * *